July 7, 1964
F. P. FINCK, JR  3,140,073
FLUX AMPLIFIED SOLENOID VALVE WITH SELECTIVELY
SEPARABLE SECTIONS
Filed May 11, 1962  2 Sheets-Sheet 1
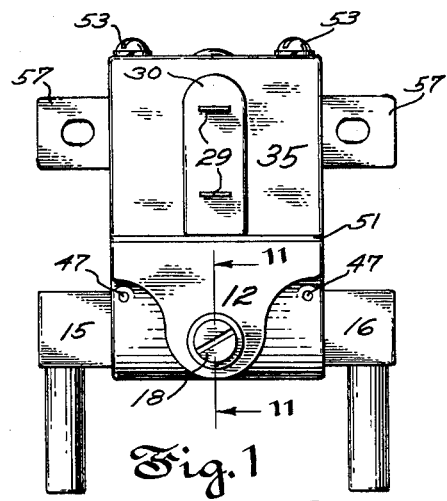
Fig.1
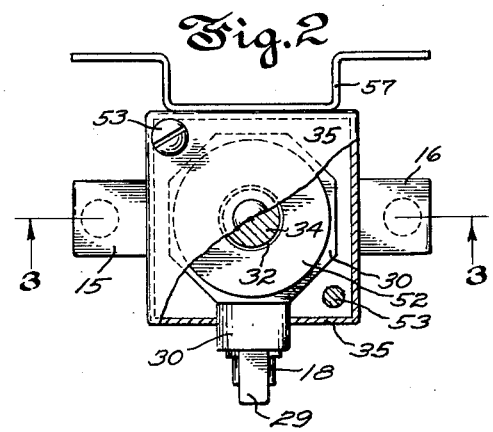
Fig.2
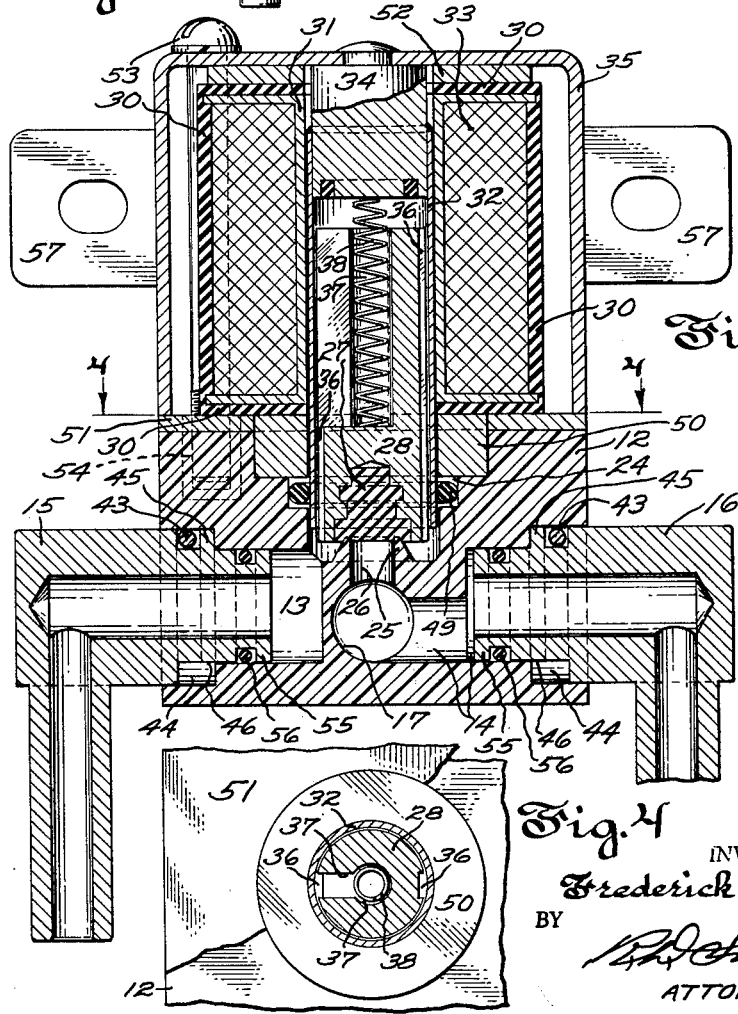
Fig.3
Fig.4
INVENTOR.
Frederick P. Finck, Jr.
BY
Ed. Smith
ATTORNEY

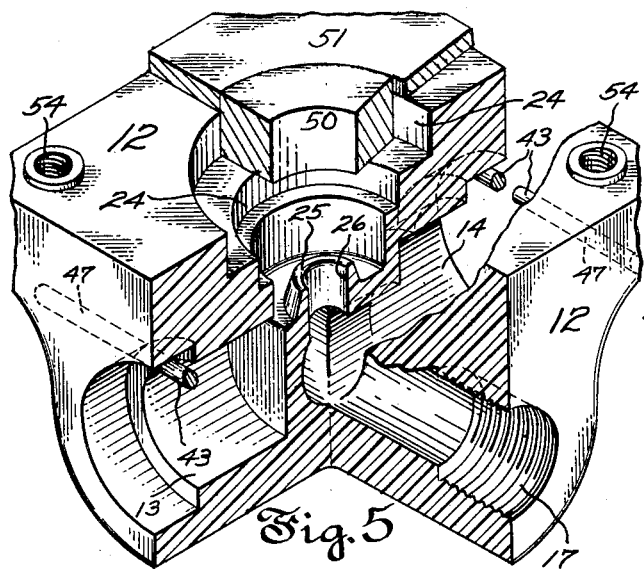
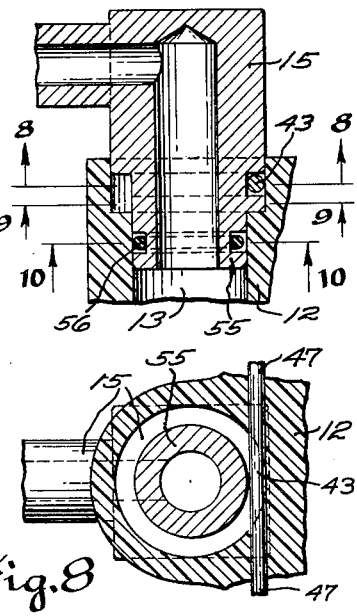
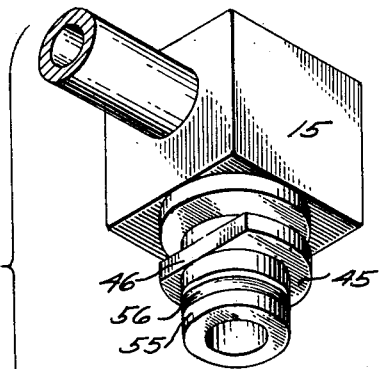
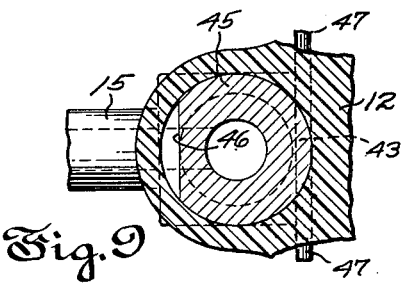
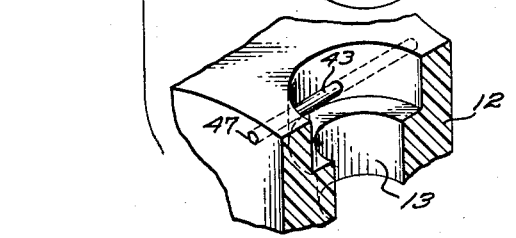
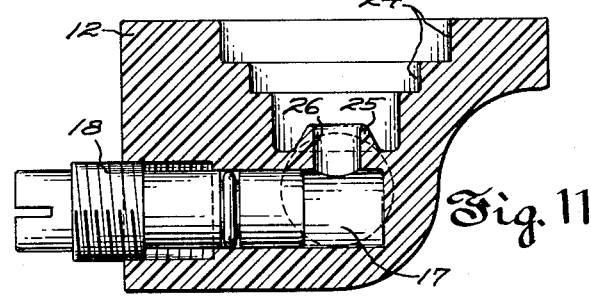
INVENTOR.
Frederick P. Finck, Jr.
BY
ATTORNEY United States Patent Office 3,140,073
Patented July 7, 1964

3,140,073
FLUX AMPLIFIED SOLENOID VALVE WITH
SELECTIVELY SEPARABLE SECTIONS
Frederick P. Finck, Jr., Fairfield, Conn., assignor to Connecticut Coil Corporation, Bridgeport, Conn., a corporation of Connecticut
Filed May 11, 1962, Ser. No. 194,104
8 Claims. (Cl. 251—129)

This invention relates to easily cleanable valves particularly of the electro-magnetically actuated type having a knockdown construction which enables parts, and particularly the conduit fittings, to be disassembled, sterilized and reassembled quickly and preferably without the use of tools. Such characteristics are important in a valve where the controlled fluid is a beverage such as milk or any liquid containing ingredients that will spoil or soon become contaminated such as the various kinds of drinks commonly dispensed by coin operated apparatus.

An object of the invention is to construct a valve for this purpose which comprises for sanitary purposes an integral one-piece base body containing passageways having a communicating relationship produced by contours of cavities molded in the plastic body whereby to avoid concealed or hard-to-reach crevices that are commonly present between assembled parts in composite valve bodies. It is a particular object of these improvements to do away with screw threads in the valve body as a means for receiving and retaining the conduit fittings.

Another object is so to construct a solenoid actuated valve that its electro-magnetic parts are separable from the base body of the valve and can easily be reassembled preferably without the use of tools.

Another object is to enable conduit fittings without screw threads to be quickly detachable and reassembled with the valve body independently of any means for holding the electro-magnetic actuating parts to the valve body.

A related object is to enable conduit fittings to be locked in and removed from the valve body by mere manipulation of the fittings.

A particular object of the present improvements is to amplify the electro-magnetic power of the solenoid in its functioning to open and close the valve and to accomplish this without interfering with the desirable characteristics of a knock-down construction or endangering escape of the valve controlled fluid from its passageways in the valve body into the working parts of the solenoid.

These and related objects of the invention will become apparent in greater detail from the following description of a successful embodiment of the invention having reference to the appended drawings wherein:

FIG. 1 is a view in elevation showing the improved solenoid valve and conduit fittings in suitable actual size.

FIG. 2 is a plan view of the same.

FIG. 3 is a view taken in section on the plane 3—3 in FIG. 2 looking in the direction of the arrows.

FIG. 4 is a view taken in section on the plane 4—4 in FIG. 3 looking in direction of the arrows and enlarged.

FIG. 5 is a broken-away isometric view of the base block of the valve and the cavity shape molded therein.

FIG. 6 is an exploded isometric view showing one of the angled conduit fittings and its manner of interlockable insertion in a socket in the base block.

FIG. 7 is a fragmentary view showing a demountable conduit fitting interlocked with its socket in the base block.

FIGS. 8, 9 and 10 are views taken in section respectively on the planes 8—8, 9—9 and 10—10 in FIG. 7, looking in the direction of the arrows.

FIG. 11 is an enlarged view taken in section on the plane 11—11 in FIG. 1 looking in the direction of the arrows.

The body 12 of this improved valve is preferably molded as a one-piece integral block of suitable plastic, such as "LUCITE" if transparency is desirable. Body 12 is recessed to form cavities opening outward through three sides thereof. Other plastics suitable for the purpose are plastics known by such trademarks as "IMPLEX" and "LEXAN," the latter being a polycarbonate resin. The mouths of two of these passageways 13 and 14 form sockets adapted to receive in releasably interlocked relationship the inserted end of a fluid inlet conduit fitting 15 and a fluid outlet conduit fitting 16 respectively which may be alike. A hole 17 intersects the conduit passageways 13 and 14 at right angles and is receptive to a flow modulating adjustable screw plug 18 having threaded engagement in hole 17.

Also incorporated in the inner shape of the molded valve body 12 is a terraced or stepped round recess 24 at the bottom of which there is formed by the molded shape of the valve body the valve seat 25 surrounding an orifice 26 which gives communication both to passageway 13 and to passageway 14 when the valve is open. The valve is open when a moderately soft valve disc insert 27 in the valve plunger 28 is lifted from the valve seat 25. Plunger 28 comprises a cylindrical member of magnetically attractable material guided for free sliding movement lengthwise in the stationary rigid solenoid sleeve 32 that is surrounded by a spool 31 of non magnetic material carrying the electric winding 33 of the solenoid. The top end of the hollow interior of the stationary sleeve 32 is closed by a plug 34 to which is fixed the cross wall of a casing shell 35 that encloses all parts of the electro-magnetic actuating mechanism that are superimposed on the valve body 12. The entire spool 31 and its winding 33 is encased within a jacket 30 of epoxy type resin in which are molded as inserts. The conductive prongs 29 serve as "plug-in" circuit terminals of the solenoid winding protruding out from casing shell 35 in insulated relation thereto.

The periphery of both sides of plunger 28 is grooved lengthwise to a shallow extent at 36. At least one of such grooves communicates with a lengthwise extending cavity 37 shaped in cross section like a key-hole as shown in FIG. 4 to give relief to the valve fluid that otherwise might become trapped and compressed between the top end of plunger 28 and the core plug 34 when the plunger rises toward the top of sleeve 32. Cavity 37 contains and retains the compression spring 38 which constantly urges the plunger 28 downward to close the valve.

It has been proposed heretofore to fasten a casing shell such as 35 in easily removable relation to an underlying valve body by means of through bolts and wing nuts, and where pipe threads have not been employed as a means of attaching conduit fittings to the valve body it has been proposed that the presence of the casing shell and/or solenoid be utilized to prevent detachment of the conduit fittings from the valve body. Because cleaning and sterilizing of the conduit fittings is required more frequently than is required the removal of the solenoid parts from the valve body, the present improvements provide improved conduit fittings that are removable and replaceable by mere manipulation of the fittings while the solenoid and the movable valve parts remain present and joined to the valve body by elongate screws 53.

FIGS. 7 to 10, inclusive, picture the construction devised for this purpose which comprises a straight ridge or other barrier 43 extending crosswise of the space in socket 44 in secant-like relation to the circular curvature of the wall of the socket. Space is provided back of such barrier inwardly of the socket to accommodate a flange 45 on the conduit fitting. This flange is flatted at 46 so as to clear the barrier 43 as the fitting is thrust as far as it will go into the socket with the flat 46 parallel with barrier 43. At this time a partial turn of the fitting within the socket will cause the round of flange 45 to be encountered by the barrier 43 so as to prevent withdrawal of the fitting from the socket.

In the particular construction herein shown to illustrate the invention the barrier is in the form of a pin 43 whose end portions 47 are lodged in the plastic valve body 12 so that an intermediate portion of the length of the pin spans the space within the socket. Thus pin 43 cooperates with flange 45 to lock and unlock the conduit fitting by merely turning the latter manually after it has been inserted and before it is to be withdrawn. The circumferentially grooved terminal portion 55 of each conduit fitting is reduced in diameter and fits a correspondingly reduced diameter of socket 44 and carries in its circumferential groove an O-ring 56 to seal the joint against escape of valve controlled fluid. In some constructions of valves the axial positions of the pin 43 and the O-ring 56 might be interchanged but it is preferable to keep the fluid away from the barrier pin 43.

Other features of the present improvements enable the actuating force of the solenoid 33 as exerted on the valve plunger 28 to be amplified by a relatively massive flux ring 50 whose vertical thickness is preferably approximately equal to half the breadth of the sleeve 32 which latter it closely surrounds. Ring 50 has a snug and removal permitting fit in the larger portion of the terraced recess 24 and intervenes between the insulative jacket 30 of the solenoid and valve body 12, projecting a little out of the body recess toward the solenoid. Beneath flux ring 50 an O-ring 49 is compressed in a portion of the terraced recess 24 having a reduced diameter thus preventing escape of valve controlled fluid from valve body 12 into solenoid casing 35.

Flux ring 50 is magnetically associated with the solenoid casing shall 35 by means of an annular plate 51 intervening therebetween and surrounding the flux ring 50 with whose top surface the plate comes flush where the ring 50 protrudes from valve body 12. (See FIG. 5.) A comparable flux disc 52 intervenes between the insulative jacket 30 of the solenoid and the top or cover wall of casing shell 35. Flux ring 50 constitutes magnetically permeable body of considerable mass in the field of the solenoid in the region where the movement of plunger 28 takes place and thereby builds up the polar strength of the solenoid in a manner to render the electromagnetic operation of the valve more positive and dependable.

The long assembly screws 53 pass freely through clearance holes in plate 51 and enter removably into threaded engagement with nut-like inserts 54 embedded fixedly in valve body 12. Finally the casing shell 35 may be equipped with a mounting bracket such as 57 for holding the entire solenoid valve against a supporting surface.

The use and operation of this improved solenoid valve is as follows. The outlet end of an electric attachment cord (not shown) will be joined to the electrical terminal prongs 29. When current is supplied to energize the solenoid winding 33 the resulting magnetic field, whose strength is amplified by the flux ring 50, will lift the valve disc 27 from its seat 25 and thus open the valve so that fluid can flow through and from conduit fitting 15 to and through conduit fitting 16, escape of such fluid out of the valve body being prevented by O-rings 49 and 56. Upon deenergization of the solenoid, spring 38 recloses the valve. When the fluid passageways within valve body 12 need cleaning this can be done by first turning the conduit fittings 15 and 16 and then withdrawing them from their sockets 44 while the solenoid with its valve operating parts remains secured to the valve body by means of its casing 35 and holding screws 53. Alternatively or at the same time the solenoid and its valve operating parts can be separated from the valve body 12 by merely removing the holding screws 53.

All departures from the exact shapes and arrangement of parts that are herein disclosed merely to illustrate a possible embodiment of the invention and which fall within a broad interpretation of the definitions in the appended claims are intended to be covered thereby.

What is claimed is:

1. A solenoid operated valve including solenoid structure, a non magnetic bearing sleeve projecting endwise beyond said structure and a magnetic valve operating plunger slidable in the projecting portion of said sleeve, comprising in combination with said solenoid structure sleeve and plunger a valve body having a valve seat contactable by said plunger to close the valve and having a bore leading away from said seat to an end of said bore opening outward through a surface of said valve body facing said solenoid structure, said bore being enlarged at its said open end by a terraced recess surrounding said sleeve, a flux ring magnetically circuited to form one pole of said solenoid structure surrounding said sleeve and nested as a loose insert in said terraced recess in unattached relation to said valve body, and means to fasten together said solenoid structure and said valve body with said flux ring therebetween whereby to clamp and retain said flux ring in said terraced recess.

2. A solenoid operated valve as defined in claim 1, in which the said flux ring closely surrounds the said sleeve and has an axial overall thickness approximately equal to half the breadth of said sleeve.

3. A solenoid operated valve as defined in claim 2, in in which the said terraced recess is substantially filled by the said flux ring.

4. A solenoid operated valve as defined in claim 3, in which the said flux ring protrudes axially from the said recess toward the said solenoid structure, together with a plate of ferrous metal intervening axially between the said solenoid structure and the said valve body and also intervening annularly between the said flux ring and the said solenoid structure.

5. A solenoid operated valve as defined in claim 1, together with an O-ring closely surrounding the said sleeve and filling an annular space in said bore with sufficient completeness to preclude escape of valve controlled fluid from the said valve body into the said casing shell.

6. A solenoid operated valve as defined in claim 1, in which the said valve body has a passageway for valve controlled fluid leading to the said valve seat and opening outward from said body to form a space affording threadless socket, a conduit fitting having a threadless end portion receivable in said socket with a fluid-tight fit, and threadless fastening means forming a bayonet type of joint between said socket and said fitting including a keeper confined in and spanning the space in said socket and a catch formed on said end portion of said conduit fitting shaped to be retainingly locked within said socket or freed for removal therefrom by said keeper depending on the rotary position of said conduit relative to said valve body, said conduit fitting being shaped to form an elbow outside of and close to said valve body thereby to provide a handle by means of which said fitting can be manually swung with forceful leverage for inserting and removing it with respect to said socket.

7. A solenoid operated valve as defined in claim 6, in which the said socket is round in profile and the said keeper comprises a barrier spanning the space in said socket in secant-like relation to the concave surface thereof, and the said catch comprises a circularly incomplete annular flange on the said end portion of the said conduit fitting sufficiently reduced in radial extent at one point in its circumference to enable said flange to pass said barrier in an axial direction in one rotary position of said conduit fitting relative to the said valve body.

8. A solenoid valve as defined in claim 7, in which the said barrier comprises a length of straight wire having its opposite end portions withdrawably lodged in holes in the said valve body at respectively opposite sides of the said socket.

References Cited in the file of this patent

UNITED STATES PATENTS

| | | |
|---|---|---|
| 959,618 | Schmidt | May 31, 1910 |
| 2,353,835 | Lane | July 18, 1944 |
| 2,619,986 | Goepfrich | Dec. 2, 1952 |
| 2,749,151 | Lyons | June 5, 1956 |
| 2,828,937 | Kreitchman | Apr. 1, 1958 |
| 3,029,062 | Thomas | Apr. 10, 1962 |
| 3,059,894 | Knecht | Oct. 23, 1962 |

FOREIGN PATENTS

| | | |
|---|---|---|
| 732,186 | Great Britain | June 22, 1955 |